(12) United States Patent
Niemeyer et al.

(10) Patent No.: US 10,362,299 B1
(45) Date of Patent: Jul. 23, 2019

(54) SYSTEM FOR INTRODUCING PHYSICAL EXPERIENCES INTO VIRTUAL REALITY (VR) WORLDS

(71) Applicant: DISNEY ENTERPRISES, INC., Burbank, CA (US)

(72) Inventors: Gunter D. Niemeyer, Pasadena, CA (US); Lanny S. Smoot, Thousand Oaks, CA (US); Vinay Chawda, Sunnyvale, CA (US); Matthew Keith Xi-Jie Pan, Vancouver (CA)

(73) Assignee: DISNEY ENTERPRISES, INC., Burbank, CA (US)

( * ) Notice: Subject to any disclaimer, the term of this patent is extended or adjusted under 35 U.S.C. 154(b) by 89 days.

(21) Appl. No.: 15/688,375

(22) Filed: Aug. 28, 2017

(51) Int. Cl.
| | |
|---|---|
| *G06F 3/01* | (2006.01) |
| *B25J 11/00* | (2006.01) |
| *B25J 13/08* | (2006.01) |
| *H04N 13/344* | (2018.01) |

(52) U.S. Cl.
CPC .......... *H04N 13/344* (2018.05); *B25J 11/003* (2013.01); *B25J 13/089* (2013.01); *G06F 3/012* (2013.01); *G06F 3/014* (2013.01)

(58) Field of Classification Search
CPC ........ G06F 3/011; G06F 3/016; G06T 19/006; B25J 11/003
See application file for complete search history.

(56) References Cited

U.S. PATENT DOCUMENTS

| | | | |
|---|---|---|---|
| 2002/0062177 A1* | 5/2002 | Hannaford | B25J 9/1689 700/245 |
| 2009/0231272 A1* | 9/2009 | Rogowitz | G06F 3/04815 345/156 |
| 2016/0054837 A1* | 2/2016 | Stafford | G06F 3/012 463/33 |
| 2016/0295038 A1* | 10/2016 | Rao | G06F 3/005 |
| 2016/0349835 A1* | 12/2016 | Shapira | G06F 3/011 |
| 2018/0255285 A1* | 9/2018 | Hall | A63G 27/00 |

* cited by examiner

*Primary Examiner* — Jeffery A Brier
(74) *Attorney, Agent, or Firm* — Marsh Fischmann & Breyfogle LLP; Kent A. Lembke

(57) ABSTRACT

A system for providing a user of a virtual reality (VR) system with physical interactions with an object in the real world or in the surrounding physical space while they are concurrently interacting in the virtual world with a corresponding virtual object. The real world object is dynamic with the system including a physical interaction system that includes a robot with a manipulator for moving, positioning, and/or orienting the real world object so as to move it into contact with the user. For example, the physical object is moved into contact with a tracked body part of the user, such as a hand, a tracked contact surface on the user's body, and so on, at a time that is accurately synchronized with a time of an interaction event occurring in the virtual world being created by the VR system.

20 Claims, 12 Drawing Sheets

SYSTEM FOR INTRODUCING PHYSICAL EXPERIENCES INTO VIRTUAL REALITY (VR) WORLDS

BACKGROUND

1. Field of the Description

The present description relates, in general, to virtual reality (VR) systems and their uses to generate unique user experiences, and, more particularly, to systems and methods for providing the user of a VR system with physical experiences or haptic interactions while they are experiencing a VR world or environment provided by a VR system.

2. Relevant Background

There is a growing interest in virtual reality (VR) games and applications in the entertainment and education industries. VR typically refers to computer technologies that use virtual reality headsets (or head mounted displays (HMDs)) to generate realistic images, sounds, and other sensations that replicate a real environment or create an imaginary setting. VR also simulates a user's physical presence in this environment. VR has been defined as a realistic and immersive simulation of a three-dimensional 360-degree environment, created using interactive software and hardware, and experienced or controlled by movement of the body or as an immersive, interactive experience generated by a computer.

A person using virtual reality equipment is able to "look around" the artificial world, and, with higher quality VR systems, move about in it and virtually interact with features or items depicted in the headset. A virtual world or environment (or its associated imagery) is displayed with a virtual reality headset. VR headsets may include head-mounted goggles with a screen in front of the eyes. Programs may include audio and sounds through speakers or headphones so that the user can hear the virtual world, too.

Generally, though, the user can only "virtually" interact with objects they can see within the displayed virtual world of the headset and cannot touch or feel the virtual objects because the virtual objects do not exist in the real world. In some cases, advanced haptic systems, in which the VR user wears gloves, holds a game or other controller, and/or wears haptic clothing or a suit, may provide the user with some tactile information such as for use in medical, video gaming, and military training applications. Similarly, some VR systems used in video games can transmit vibrations and other sensations to the user through the game controller, but these feedback devices still do not allow a user to feel and touch the virtual objects. Hence, the user experiences a sensory inconsistency between what they can see and hear in the virtual world and what they perceive with their sense of touch, and the VR users are reminded or made aware of the artificial nature of any virtual world provided by existing VR systems.

SUMMARY

Briefly, a system is described herein that provides a user of a virtual reality (VR) system with physical interactions with an object in the real world or in the surrounding physical space while they are concurrently interacting in the virtual world with a corresponding virtual object. The real world object is dynamic with the system including a physical interaction system that includes a robot with a manipulator for moving, positioning, and/or orienting the real world object so as to move it into contact with the user (e.g., a tracked body part such as a hand, a tracked contact surface on the user's body, and so on) at a time that is accurately synchronized with a time of an interaction event occurring in the virtual world being created by the VR system.

In creating the new system, the inventors recognized that physical interactions with dynamic objects in VR should be generated with precise coordination and synchronization of the physical object and virtual object counterpart in both location and timing. If either the position or time of impact or physical interaction is not matched, the user experiences discrepancies, which causes the illusion of the VR world to be broken or degraded. To provide such coordination and synchronization, the system includes a robotic mechanism that is external to (and spaced apart from) the user in the space used for the VR experience, and the robotic mechanism is typically hidden from the user's view until they place the headset over their eyes.

The robotic mechanism (or physical interaction system) is controlled to selectively move the physical or real world object in the space. The system includes devices for tracking one or more contact surfaces or body parts (such as the hands) of the user during the VR experience. A control program for the robotic mechanism can then use this tracking information to move the robotic mechanism's manipulator (e.g., a robotic arm with a gripper at its end) to keep the physical object out of the user's reach (or not contacting the user's body at a tracked contact surface or body part) until the very moment (defined by the VR system for an interaction event) when the object is precisely placed into the user's hand (or other contacting surface on the user's body) with the appropriate orientation and velocity (speed and direction). While the virtual object corresponding with the physical object may be flying, moving, or undertaking any arbitrary actions in the virtual world, it is only the exact time of impact in the virtual world (time of an interaction event) when the robot has to be controlled to place the physical object at exactly the "same location" (e.g., in the user's hand when a virtual object is placed in the user's virtual hand in the virtual world by the VR system).

Using a robotic mechanism to control the physical object provides the system with the necessary level of precision. However, use of robotic mechanism also enhances safety as the robotic mechanism can be operated to actively remain a distance outside a predefined safety envelope about the user's body until the appropriate time (move the manipulator arm to provide physical interaction with the object at the time defined for the interaction event). The robotic mechanism's controller may also monitor and control interaction forces with the VR system user to prevent unsafe collisions. The programmable nature of the system further allows other impulsive effects such as snatching the physical object from the user's hand at an appropriate time and location. In other cases, the interaction event is an extended event such as a pushing/pulling on the user (on or at the user's contact surface), emulating the breaking of the object, or any variable dynamic interaction that is synchronized between the physical and virtual worlds.

More particularly, a system is provided that is adapted for providing a dynamic physical interaction to a person during a virtual reality (VR) experience. The system includes a VR system including a headset with a display screen and a VR rendering module generating a video output. The display screen displays an image of a virtual world based on the video output. The system also includes a physical interaction system comprising a robotic mechanism with an object manipulator and a robot control module generating commands for operating the robotic mechanism to selectively position a physical object within a space. During operations, a wearer of the headset is positioned in the space, and the image of the virtual world includes an image of a virtual object corresponding to the physical object. Further, the commands generated by the robot control module cause the robotic mechanism to move the physical object in the space based on a state of the virtual object in the virtual world.

In some preferred embodiments, the commands generated by the robot control module cause the object manipulator to move the physical object into contact with a surface on a body part of the wearer at a first time. The image of the virtual world includes an image of a virtual body part corresponding to the body part of the wearer. Further, the image of the virtual object is shown in the image of the virtual world to move into contact with the image of the virtual body part at a second time matching the first time.

In these embodiments, a tracking system can be included that generates tracking data for the body part of the wearer. Then, the image of the virtual body part is provided at a location in the image of the virtual world corresponding to a body part location identified by the tracking data, and the object manipulator moves the physical object to a location in which the physical object at least partially coincides with the body part location to cause the physical object to contact the body part of the wearer at the first time. Further, the tracking data includes an orientation of the body part of the wearer, and the commands cause the object manipulator to adjust an orientation of the physical object based on the orientation of the body part of the wearer prior to the first time.

In some cases, the state of the virtual object in the virtual world includes a velocity. Then, the commands can cause the object manipulator to move through the space at a velocity matching the velocity of the virtual object in the virtual world. In these or other cases, the commands generated by the robot control module cause the object manipulator to release the physical object at a third time after the first time. In some embodiments, the body part includes a hand of the wearer of the headset, the surface is the palm of the hand, and the commands cause the object manipulator to halt travel at the location or at a preset distance past the location at about the first time and/or after a predefined contact force is imparted or detected by the control module of the robotic mechanism.

DETAILED DESCRIPTION

Figure 1:
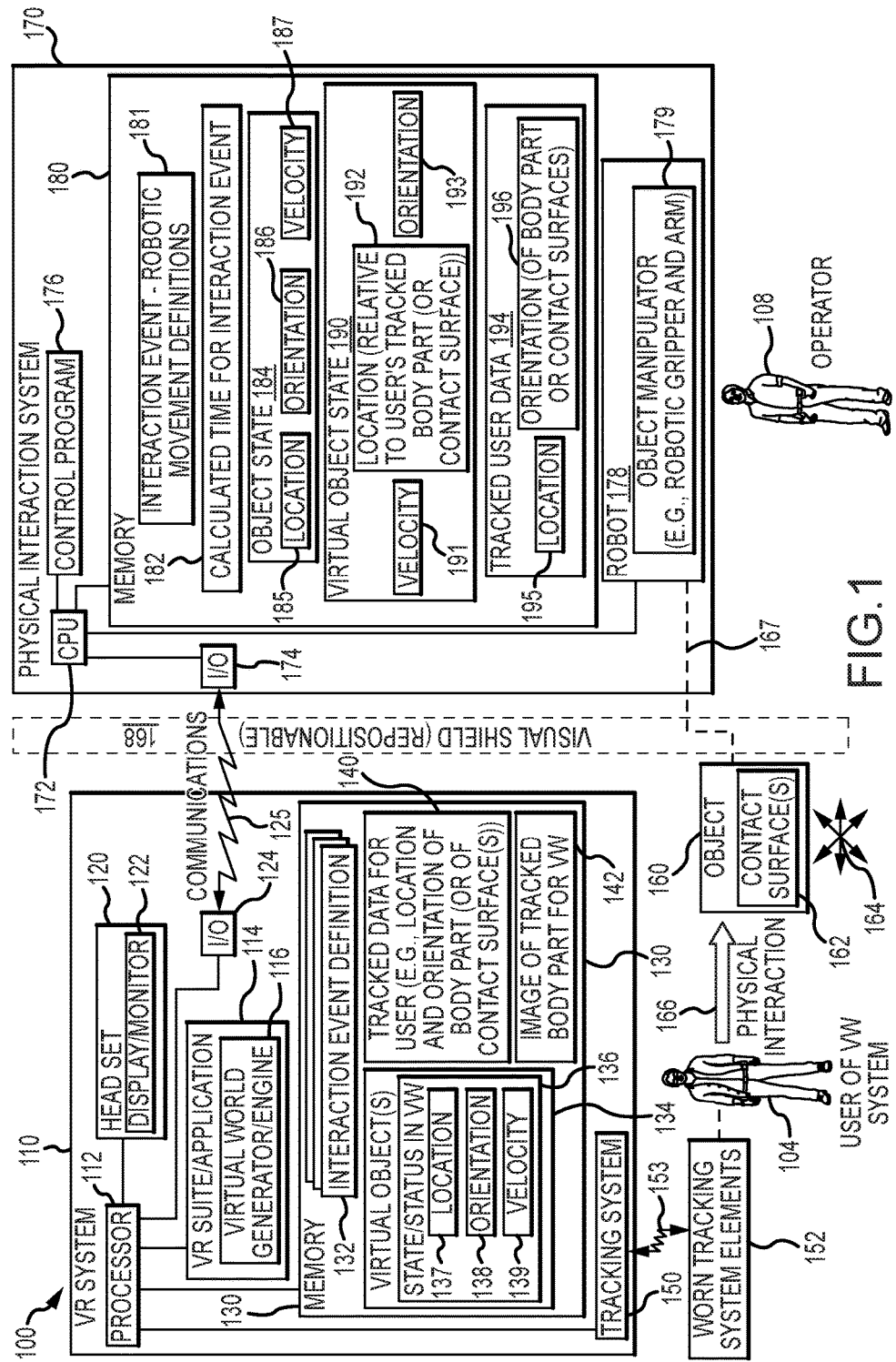
FIG. 1 is a functional block diagram of a system for providing a user of a VR system with physical experiences that are synchronized with events or activities being generated in a VR world or environment by the VR system.

Prior to turning to specific examples and/or implementations, it may be useful to discuss more generally the components and processes that may be used to provide a user of a VR system with a haptic experience to increase the quality of the VR world or experience (or to make the VR experience "more real"). FIG. 1 illustrates a functional block diagram of a system 100 for inserting haptic experiences into a VR world for a user 104 of a VR system 110. Particularly, during operations of the system 100, a user 104 of a VR system 110 is able to have physical interactions 166 with a physical or real world object 160. The object 160 has one or more contact surfaces 162 that are oriented so as to mate with a tracked body part and/or contact surfaces on the body of the user 104 during or just prior to the physical interaction 166 as shown with arrows 164 by the physical interaction system 170 (e.g., by a robot 178 and its object manipulator 179 in the system 170). The direction of travel toward and away from the user's body part/contact surfaces as well as the velocity of the object 160 is also controlled and/or provided by operations of the physical interaction system 170 as shown with dashed line 167 and also with arrows 164 (e.g., the object 160 may be moved in any direction and at nearly any desired speed to provide a desired physical interaction 166 with the body part/contact surfaces of the user 104).

The VR system 110 includes a processor 112 that executes code or programming to provide the functionality of a VR suite or application 114. The VR system 110 includes a headset (or headgear/eyewear) 120 that is worn by the user 104 during operations of the system 100. The headset 120 includes a display or monitor 122 that is operated by the processor 112 and VR suite/application 114 to display imagery or images generated by a virtual world generator/ engine of the VR suite/application 114. While such images are displayed, the user 104 typically has their vision of the surrounding physical environment or space blocked and can only see the VR images or VR world/environment provided by the VR suite/application 114. The VR system 110 further includes input/output (I/O) devices 124 for allowing a user 104 to initiate and end operations of the VR system 110 (e.g., to start or stop the VR suite/application and its creation of a VR experience). The I/O devices 124 may include wired or wireless communication devices for transmitting messages 125 to I/O devices 174 of the physical interaction system 174, and such communications 125 are typically used to share tracking data for user 104 (see data 194 in memory 180) and also to provide synchronization (in time and location) of a VR event/activity with a real world movement by the robot 178 of an object 160 to provide a desired physical interaction 166 with the user 104.

The VR system 110 includes or has access to memory 130 (with access managed by processor 112), and the memory 130 stores an interaction event definition 132. For example, it may be desirable for a user that is experiencing a virtual world created by the generator/engine 116 to also have a physical interaction 166 to make the virtual world more life-like. To this end, the event definition 132 may define particular actions by the user 104 (e.g., particular movements of one or more tracked body parts of the user 104, particular movement of the user 104 within the virtual world, and the like) that will trigger the physical interaction 166, and the event definition 132 may also define which of two or more physical objects 160 are to be positioned relative to the user 104 for the physical interaction 166 as well as the orientation and velocity 164 of the object 160 at the time of the physical interaction 166 (at the time set by the interaction event definition 132 and/or as calculated by the control program 176 as shown at 182).

For example, the interaction event definition 132 may call for the user 104 to catch or kick a ball when they place their hand or foot in a particular location in a virtual world or space with a particular orientation of contact surfaces, and the physical interaction system 170 operates to place the object 160 with its contact surfaces 162 in the proper real world space about the user 104 at the time the event 132 in the virtual world takes place. In another example, a hilt or handle of a tool or weapon that is visually presented by the generator/engine 116 in the virtual world may be provided as a physical object 160 that is placed in the hand of the user 104 with a particular orientation and at a desired speed as shown at 164 to provide the physical interaction 166 at a time that is synchronized with an occurrence of the interaction event 132 in the virtual world generated by engine 116. In both these examples, the user 104 is observing images of virtual objects on the display/monitor 122 of the headset 120 when the interaction event 132 and physical interaction 166 concurrently occur in time so that a haptic feedback or experience is inserted into the VR experience/ environment provided by the VR system 110.

To provide such functionality, the VR system 110 includes a tracking system 150 combined with tracking elements (such as a tracking glove) 152 that are worn by the user 104. Particularly, the user 104 wears the elements 152 on or near contact surface or on a body part that is the target for the physical interaction 166 (such as the palm of one or both of the user's hands, the user's head, the user's foot, the user's chest/torso, and so on) with the physical object 160. The tracking data 153 is collected and processed by the tracking system 150 to determine or generate a set of tracked data 140 that is stored in memory 130, and this may include a location and, in some cases, orientation of a body part (e.g., a hand) of the user 104 (or of the contact surfaces for that body part). The virtual world generator/engine 116 may be configured to generate and image of the tracked body part for the virtual world as shown at 142 in memory 140, and this image 142 would be presented to the user 104 via imagery displayed on the display/monitor 122 of the headset. For example, the user 104 may be able to see an image of their hand or other monitored body part in the virtual world, and, due to the tracking by system 150, the virtual hand/body part's image 142 moves in the virtual world with orientation and speed that matches that of their physical hand/body part. The interaction event definition 132 can be adapted to trigger the physical interaction 166 when the user's tracked body part/contact surface is properly positioned at a particular point along a story timeline for the virtual world.

A definition of a virtual object 134 is stored in memory 130, and the generator/engine 116 uses this definition to insert an image of the virtual object 134 that corresponds (exactly or loosely) with the physical or real world object 160 into the virtual world/environment being provided to the user 104 on the headset display/monitor 122. The virtual object 134 may have a state or status 136 defined for it at each point in time in the virtual world/reality, and the state 136 may include the location 137 of the virtual object 136 in the virtual world or space (which allows calculation of a distance between the virtual representation of the user's body part/contact surface and the virtual object in the virtual world), the orientation 138 of the virtual object 136, and the present velocity 139 of the virtual object 136 in the virtual world (which allows determination of when the physical interaction 166 should occur which typically coincides with a definition of an interaction event 132).

In some embodiments, the physical object 160 may be visible to the user 104 prior to their placing the headset 120 over their eyes. For example, the system 100 may be operated to establish a virtual world storyline that involves the physical interaction 166 between the user 104 and the physical object 160, e.g., the user 104 is shown a ball 160 and told they will be catching, throwing, grabbing, and/or kicking the ball 160 in the virtual world, the user 104 is shown a tool or weapon (e.g., a medieval or futuristic sword) with a handle or hilt that they are told they will grab or receive in their hands for use in the virtual world, and so on. At this point, all or portions of the physical interaction system 170 may be hidden from view of the user 104 via a visual shield/barrier 168, and, after the user 104 places the headset 120 on, the shield 168 may be repositioned to allow the system 170 (e.g., the robot 178) to access the object 160. This may be achieved automatically with a movement assembly (not shown) or manually by an operator 108. The operator 108 may also reposition the object 160 from this initial storyline position into a predefined position for manipulation by the robot 178 such as in the gripper of the object manipulator 179 of the robot 178, on a stand for retrieval by the robot 178, and the like.

The physical interaction system 170 is included in the system 100 to selectively move and position 164 the physical object 160 to provide the physical interaction 166 with the user 104 at a time and manner (orientation and speed and direction of movement) that is synchronized or matched with an interaction event 132 in the virtual world generated by the VR system 110. To this end, the physical interaction system 170 includes a processor 172 that manages I/O devices 174 to receive communications 125 from the VR system 110, and this communications 125 may include an interaction event definition 181 that the processor 172 stores in memory 180. This definition 181 may including definitions of movements for a robot 178 to properly position/move 164 the physical object 160 to synchronize the physical interaction 166 with the event 132 in the virtual world provided to the user 104 by VR system 110. A control program 176 is run/executed by the processor 172 to process the interaction event definition 181 and to generate control signals for the robot 178 to achieve the desired movements/positioning 164 of the object 160 with synchronization with the VR system 110.

The physical interaction system 170 includes a robot 178 to selectively move and position/orient 164 the object 160 to provide its contact surfaces 162 in a desired location relative to the user's tracked body parts/contact surfaces. The term "robot" is used in its broad sense to include nearly any electro-mechanical machine that can be operated to perform the functions described herein including supporting, gripping, and/or holding an object 160 and moving it to a desired location with a particular velocity and in a desired direction. The robot 178 typically will include an object manipulator 179 to perform these functions. The object manipulator 179 may take the form of a robotic arm with a gripper/hand at one end that can grab/receive the object 160, and the object manipulator 179 may include motors and/or servos to move the arm (and its joints) to selectively move the hand/gripper with the object 160 to provide the movement/positioning/orienting 164 of the contact surfaces 162 of the object to provide the desired physical interaction 166 (e.g., place the object 160 against or in the tracked body part/contact surfaces of the user 104 at a particular time that matches occurrence of an interaction event 132 in the virtual reality provided to the user 104 by the VR system 110).

The control program 176 is configured to compute or calculate a time 182 for an upcoming interaction event 132 in the virtual world presently generated by the VR system 110. Then, in response, the control program 176 generates control signals to the robot 178 to operate the object manipulator 179 to place/move 164 the object 176 to time the physical interaction 166 to occur at this time 182. To allow this calculation, the system 170 and/or control program 176 is configured to gather and store the following data in memory 180: (a) an object state 184 that defines a location 185 of the object 160 in a space in which the user 104 is located that may be determined by knowledge of the known location of the object manipulator and/or via a second tracking system (such as system 150) along with tracking elements provided upon the object 160 (or its contact surfaces 162) (from which a relative location of the object 160 to the tracked body part/contact surface of the user 104 can be determined), an orientation 186 of the object 160, and a current velocity 187 (direction and speed) of the object 160; (b) a virtual object state 190 that defines (from communications 125 with the VR system 110) a velocity 191 of the virtual object 136 that corresponds with the physical object 160 in VR world/space, a location 192 of the virtual object 136 in this VR world/space (e.g., relative to a virtual representation of the user 104 in the VR world/space (or their tracked contact surfaces with elements 152), which may be used to determine the time 182 for the occurrence of the interaction event 132 and velocity and movement 164 that should be imparted to the object 160 by the robot 178), and an orientation 193 of the virtual object 136 (which can be used to determine if the robot 178 should be controlled to move/reorient 164 the object 160); and (c) tracked user data 194 from the tracking system 150 via communications 125 that may include a location 195 of a user's body part or intended contact surfaces on the body of the user 124 for the physical interaction 166 and also include an orientation 196 of the user's body part/contact surfaces in the physical space that includes the system 170 (and, particularly, the user 104, the object 160, and the robot 178). When the interaction 166 is completed, the visual shield 168 may be returned to its original position to block the user 104 from viewing the physical interaction system 170 (or at least the robot 178) when they remove the headset 120, thereby furthering a desired illusion if useful in some implementations of system 100.

With system 100 understood, it may now be useful to describe with reference to figures one exemplary implementation of the system 100 during its use to provide a physical interaction to a user of a VR system. In this exemplary implementation, a VR user is instructed that in the VR world they are participating in or in which they will be immersed that a tool or weapon (such as an energy sword or saber that is the physical object in this example) will be made available for their use. In the VR world, they will use their superpower of telekinesis to concentrate on moving the tool/weapon, and, when they concentrate with enough energy, the tool/weapon will fly through the air and land (with appropriate impact forces associated with the size/weight and velocity of the flying object) in their hand. In practice, the VR world is controlled to generate a VR representation of the user's hand(s) as they reach out to an image of the object in the VR world (e.g., the virtual object), and, via communications with the controller of the robotic mechanism, the physical interaction system operates to follow the user's hand position, to orient and position the tool/weapon (hilt of sword/saber or handle of a tool/weapon for use in the VR world) relative to the user's hand (tracked by the VR system), and to move the tool/weapon (hilt, handle, or the like) into the user's outstretched hand at the moment when the interaction event occurs in the VR world.

Figure 2:
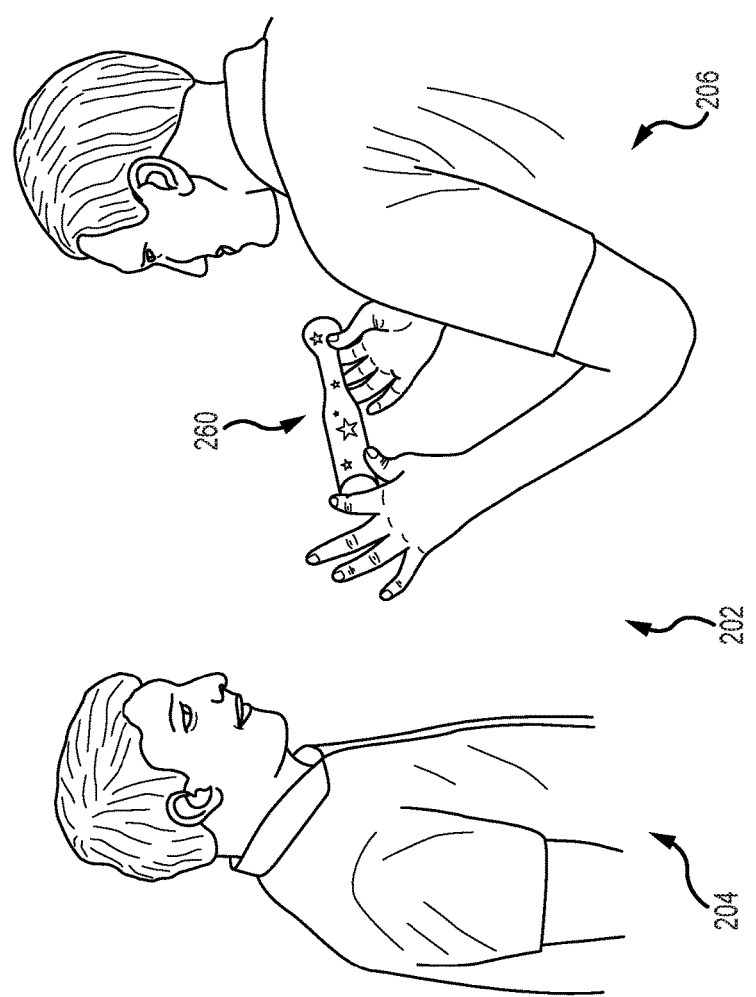
FIG. 2 illustrates a VR space in which a VR user is being prepared for a VR experience by a human VR system operator/guide and showing a physical object for interaction by the VR user during operations of a system similar to that shown in FIG. 1.
Figure 3:
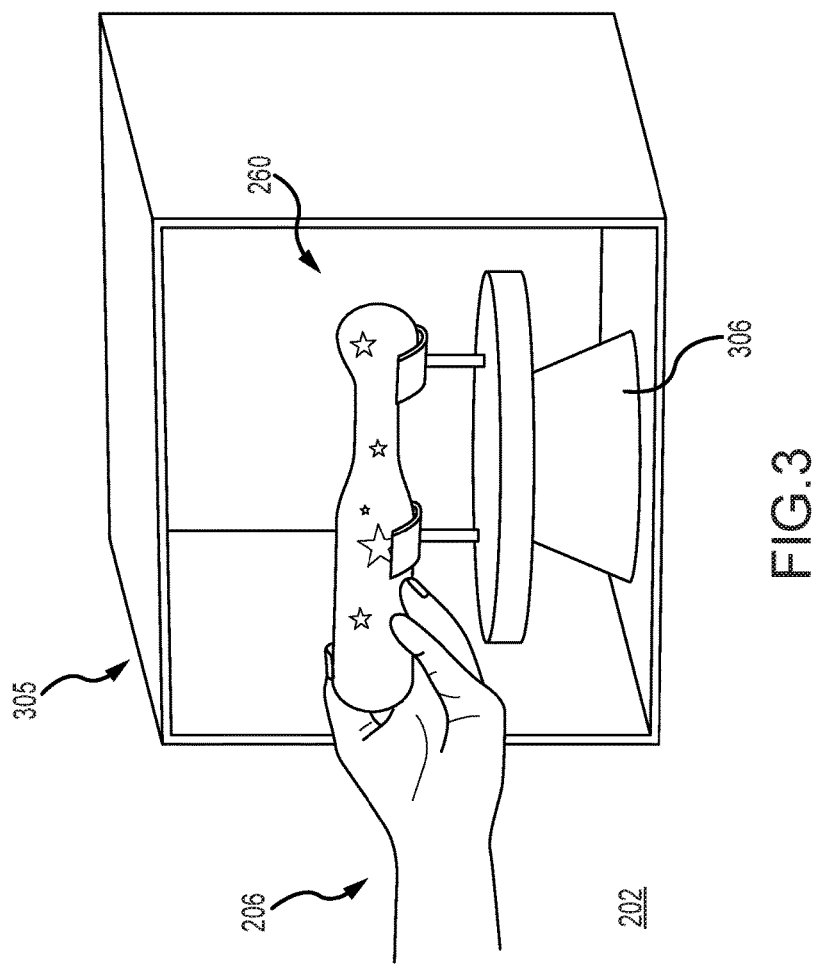
FIG. 3 illustrates positioning of the physical object upon a physical stand/support structure prior to the VR user entering the VR world.

With this VR world/physical interaction storyline in mind, FIG. 2 illustrates an initial operational step for the system (e.g., for system 100 of FIG. 1) that sets up the story and expectations of the VR user. As shown, a VR user 204 is in a VR/interaction space 202 in which the system with its VR system and physical interaction system are positioned (such as systems 110 and 170 of FIG. 1 and not visible in FIG. 2). A human operator/guide 206 is also present in the space 202, and the operator/guide 206 explains the VR/interaction storyline to the VR user 204 (e.g., that they need to use their special powers to cause a weapon/tool to fly through the air to their hand for use in the VR world). The operator/guide 206 also shows them the physical object 260 that they will be interacting with or manipulating while in the VR world. In FIG. 3, a next process (or system operation or pre-operation) step is shown in which the human operator/guide 260 is acting to place the tool/weapon (physical object) 260 is placed within a case/display 305 upon a stand 306 (both of which are physical objects in the VR space 202).

Figure 4:
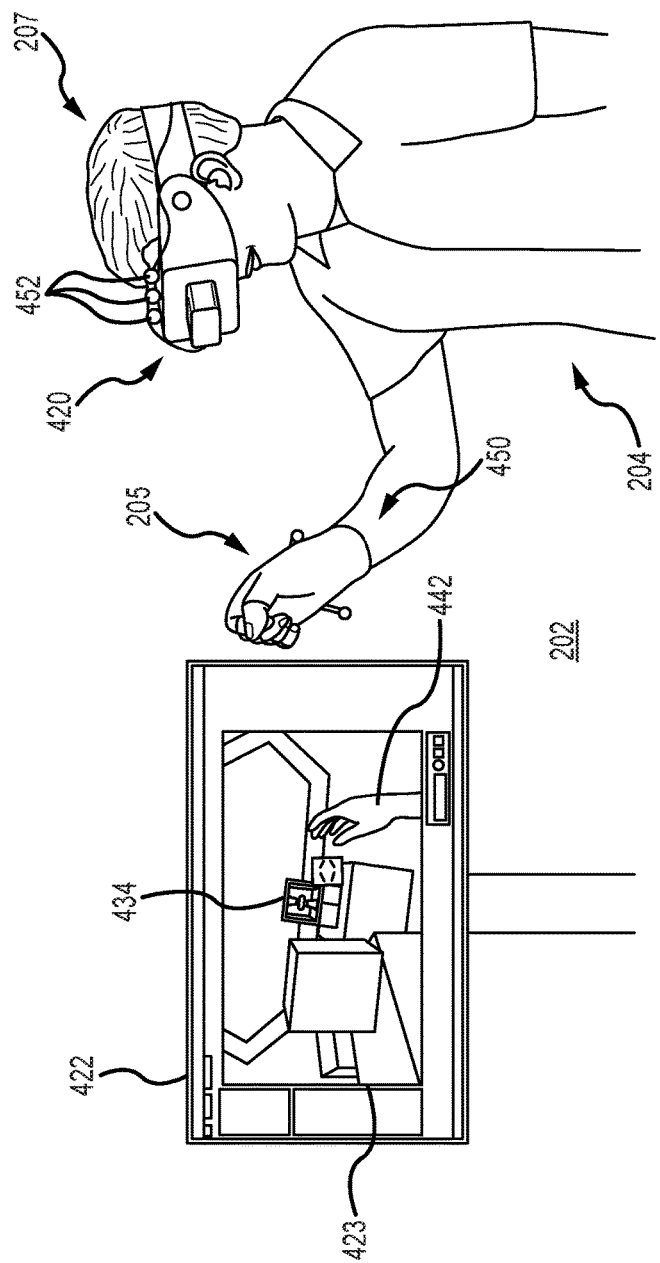
FIG. 4 illustrates an initial operating step of a system as shown in FIGS. 1-3 in which a VR user interacts with a displayed VR world.

In FIG. 4, the system has begun initial operations with the VR user 204 still located in the VR space 202 and with the user 204 shown to be wearing a VR headset 420 on their head 207 and a tracking glove 450 on their hand 205. The system (e.g., the VR system) includes a tracking system (such as system 150 in FIG. 1) that operates to track the location of the user's hand 450 by monitoring movement/location of tracking elements/buttons on the glove 450. Further, the tracking system may operate to track the position/orientation of the user's head 207 by tracking location/movement of tracking elements/buttons 452 on the VR headset 420, and the head position/orientation may be used by the VR system to determine the VR user's line of sight in the VR world.

The headset 420 includes a display screen/monitor, which is shown at 422 for ease of explanation, and the screen 422 is operated by the VR system to display a view/image 432 of the virtual world/environment in which the VR user 204 is being immersed during system operations. The VR system operates to display an image 434 of the virtual object (e.g., a representation of the physical object 260 in the form of a weapon/tool in the virtual world 423), and the virtual object image 434 may be positioned within the virtual world 423 at a location that corresponds with the base/stand 306 in the VR space 202 relative to the location of the VR user 204. The VR user 204 now moves their hand 205 about in the VR space 202, and this location (and hand orientation) is tracked by the tracking system, and such tracking information is used by the VR system to generate and locate an image 442 of the user's hand in the VR world 423 (e.g., to display an image of the tracked body part or interaction surface on the VR user's body). In this storyline, the user 204 is reaching out their hand 205 in the VR space 202 which results in the image 442 of their virtual hand (or tracked body part) also moving and extending outward toward the image 434 of the virtual tool/weapon in the displayed VR world 432 on the headset screen 422.

Figure 5:
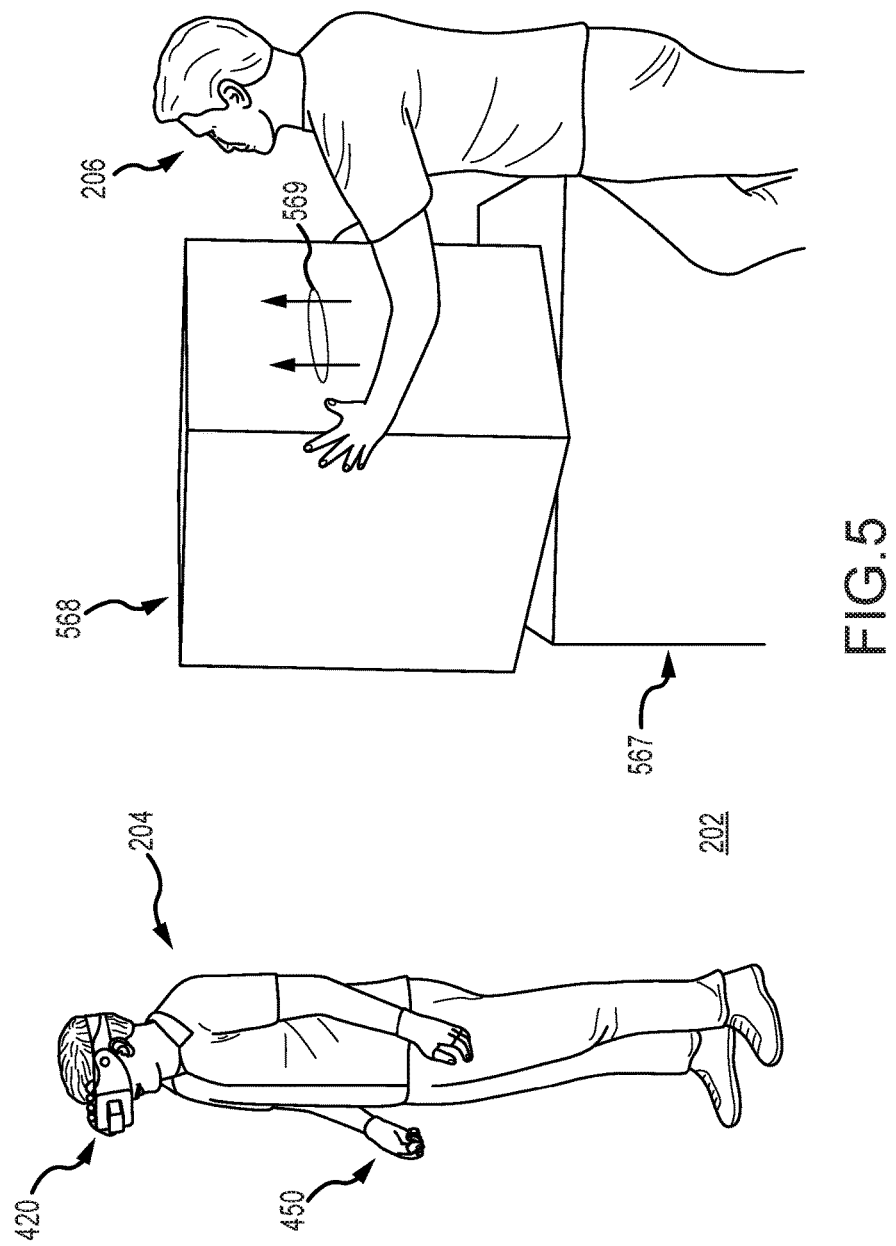
FIG. 5 illustrates a step that may be performed concurrently with the step shown in FIG. 4 in which a visual shield is moved to expose, and allow full operations of, a robotic mechanism.

Concurrently with the step shown in FIG. 4, as shown in FIG. 5, the operator/guide 206 may move in the VR space to the physical interaction system to set it up for next operations of the system. Particularly, the operator/guide 206 is shown to be positioned next to a stand/base 567 for a robotic mechanism, which was hidden from view by the VR user 204 by the cover or visual shield 568. The operator/guide 206 in FIG. 5 is shown to be removing or lifting 569 the cover/shield 568 to expose the robotic mechanism and allow it to generate the physical interaction with the physical object (weapon/tool 260).

Figure 6:
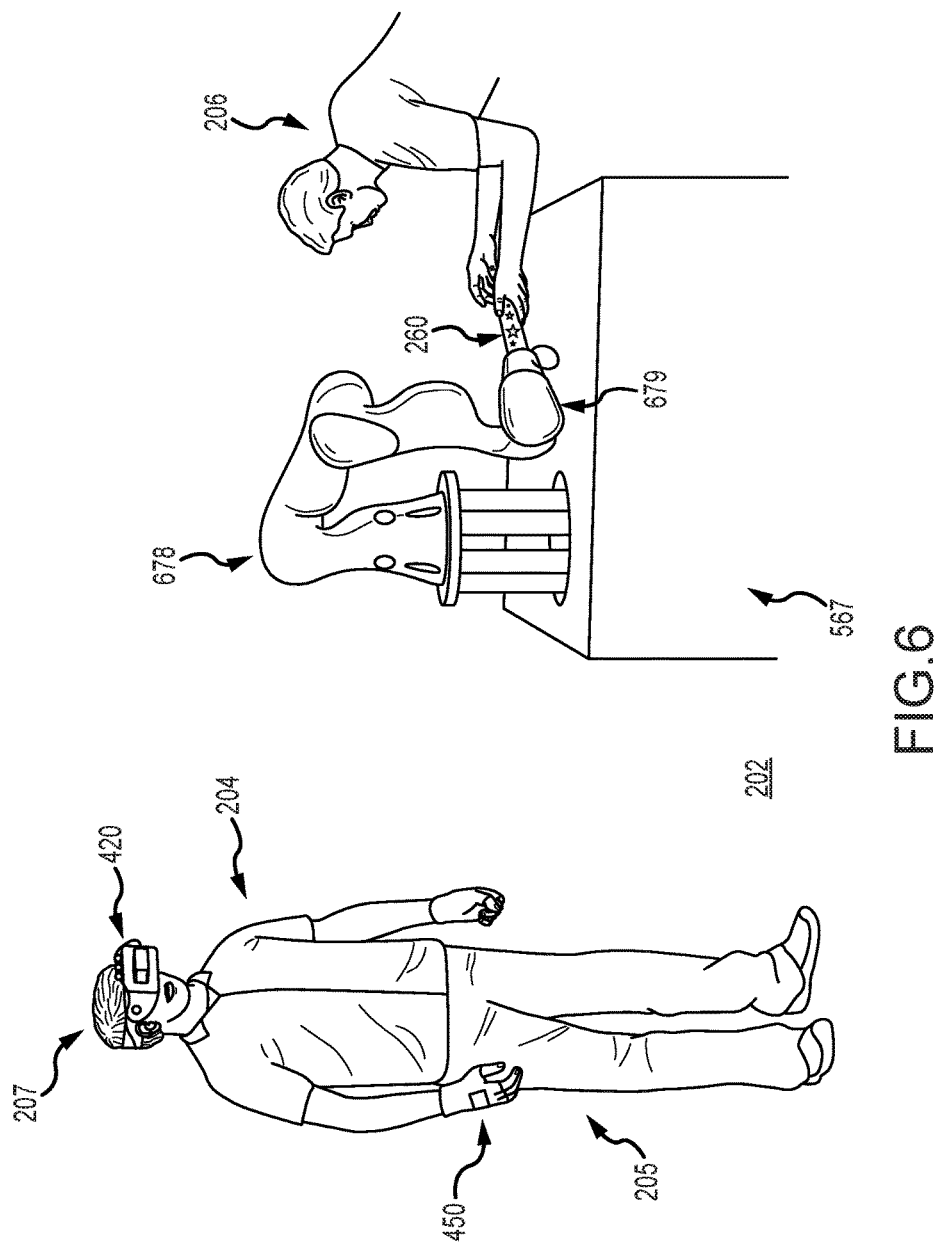
FIG. 6 illustrates a next step in the operation of the system shown in FIGS. 2-5 showing the robotic mechanism of the physical interaction system and an operator placing the physical object in the robot's gripper (or attaching it to the robot's object manipulator)

FIG. 6 illustrates the VR space 202 with the cover/shield 568 fully removed from the base/stand 567. As shown, the system includes a robotic mechanism 678 with an object manipulator 679 in the form of a movable arm with a gripper at its end. In the operating step shown in FIG. 6, the VR user 204 is still wearing the VR headset 420 and is interacting with the VR world displayed on the screen of the headset 420 (and cannot see out into the VR space 202 such that the user 204 cannot see the robotic mechanism 678 or actions by the operator 206 in the step shown in FIG. 6). In this step, the operator/guide 206 is acting to move the physical object (weapon or tool in this example) 260 from the stand 306 to the robotic mechanism 678. Particularly, the operator 206 is placing the object 260 in the object manipulator 679 (e.g., in the gripper of the robotic arm). In other embodiments, the uncovered robot may act to retrieve the object itself as an initial step or it may already be holding an object matching or similar to the object 260 (and the removal of the object 260 from the stand 306 may be manual or automated in such implementations of the system).

Figure 7:
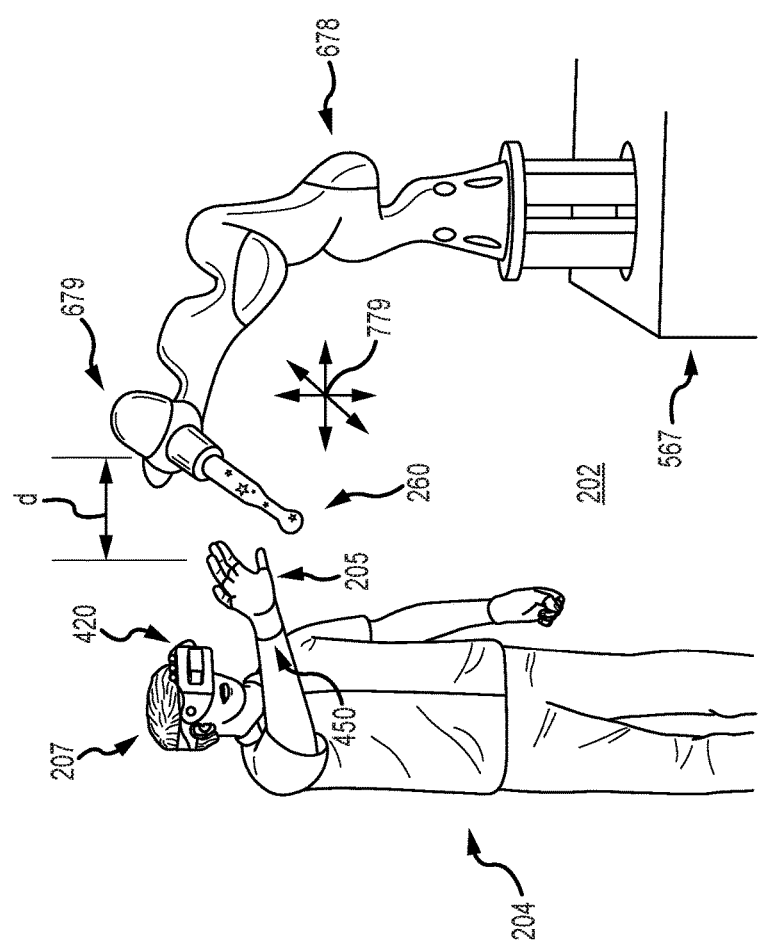
FIG. 7 illustrates operation of the system of FIGS. 2-6 while the VR user interacts with a VR world provided by the VR system and the physical interaction system concurrently acts to retain the physical object properly oriented relative to the VR user's hand but at a predefined spacing.

In FIG. 7, the VR space 202 and system is shown in a later operational step. Particularly, the VR user 204 is interacting with a VR world being generated by the VR system including operation of headset 420 to display images of the VR world including an image of the VR object corresponding with the physical object 260. The VR user 204 is shown to be moving their hand 205, which has its location and orientation tracked via tracking element glove 450 (and tracking system of the VR system), and this results in the user's hand 205 being at one or more locations in the space 202. The physical interaction system communicates with the VR system to obtain the hand location/orientation and also to obtain status of the VR world storyline (e.g., location and orientation and velocity of the virtual object relative to the user's hand in the VR world).

In response, the robotic mechanism 678 is operated so as to move the object manipulator 679 (e.g., arm with gripper) so as to move, position, and orient the physical object 260 as shown with arrows 779 in 3D space relative to the user's hand 205. The robotic mechanism 678 is operated so as to maintain the object 260 (e.g., a weapon/tool or just its handle/hilt) a predefined distance, d, apart from the user's hand 205 (or a contact surface of this tracked body part such as the palm of the hand 205). In some cases, this distance is 6 to 24 inches to allow prompt delivery of the object 260 but also minimize risk of inadvertent contact with the user 204 prior to an interaction event in VR world with the corresponding virtual object. The object 260 typically had its orientation change over time by the manipulator's motion 779 so as to mirror either the orientation of the corresponding virtual object or to prepare for proper mating with the contact surface of the tracked body part (e.g., to remain ready for movement of a particular contact surface/area of the object 260 into the palm of the user's hand 205) to obtain a physical interaction that matches that planned for the VR world.

Figure 8:
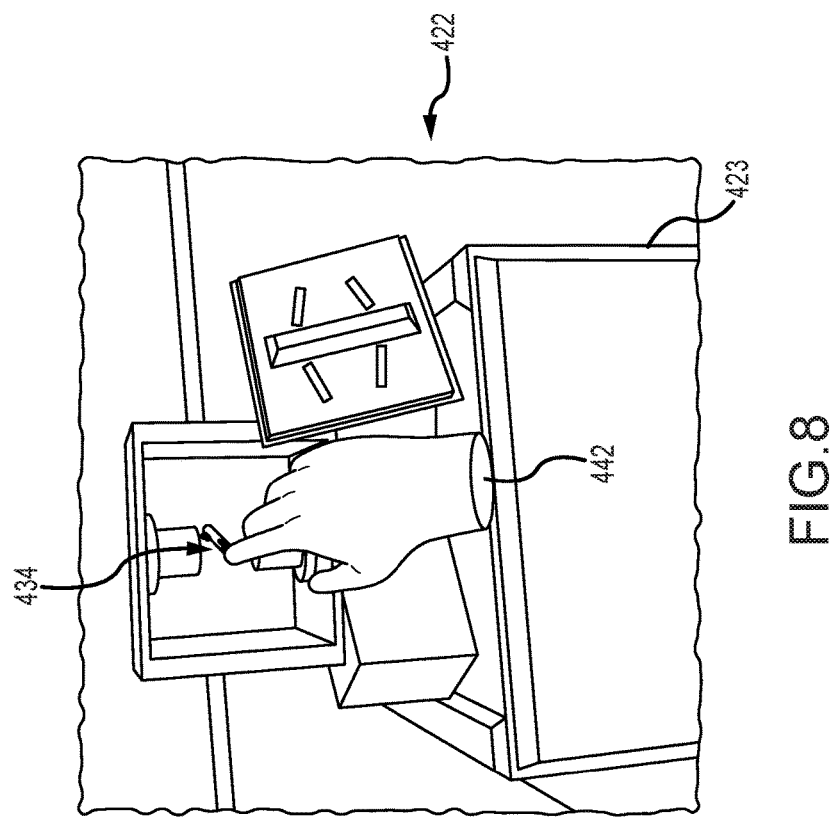
FIG. 8 illustrates a display screen/monitor of the VR headset of the system during the operations or step shown in FIG. 7.

The process step/operations of the system shown in FIG. 7 continue until the physical interaction event is triggered in the VR system (or a predefined time before the planned event to allow the robotic mechanism 678 to have adequate time to move the object 260 across the separation distance, d, at a desired velocity to provide the physical interaction and/or contact of the object 260 with the hand 205). FIG. 8 illustrates the screen/monitor 422 in the headset 420 during the step or operations of FIG. 7 of the system. As shown, the VR system is operating to present an image 423 of a VR world in which the user's hand 442 is displayed and is oriented and located similar to the user's hand 205 in the space 202. The VR world 423 includes an image of the virtual object 434 corresponding with the physical object 260, and the user's virtual hand 442 is reaching outward toward the object image 434 with their palm exposed so as to be ready to receive the object 434. Such a predefined positioning combined with proper orienting of the hand 205 (and, hence, virtual image 442) combined with timing and other parameters/actions in the VR world provided by the VR system may act as the "trigger" for an interaction event.

Once an event is triggered, the controller of the robotic mechanism 678 acts to determine a time until occurrence of the event in the VR world. The controller then acts to move the manipulator 679 at a time before the event occurrence time that is chosen for a predefined delivery velocity to cause the object 260 to be delivered into the user's hand 205 in a time synchronized manner at the delivery velocity and with a desired orientation (e.g., one matching that of the user's hand and/or of the corresponding virtual object in the VR world).

Figure 9:
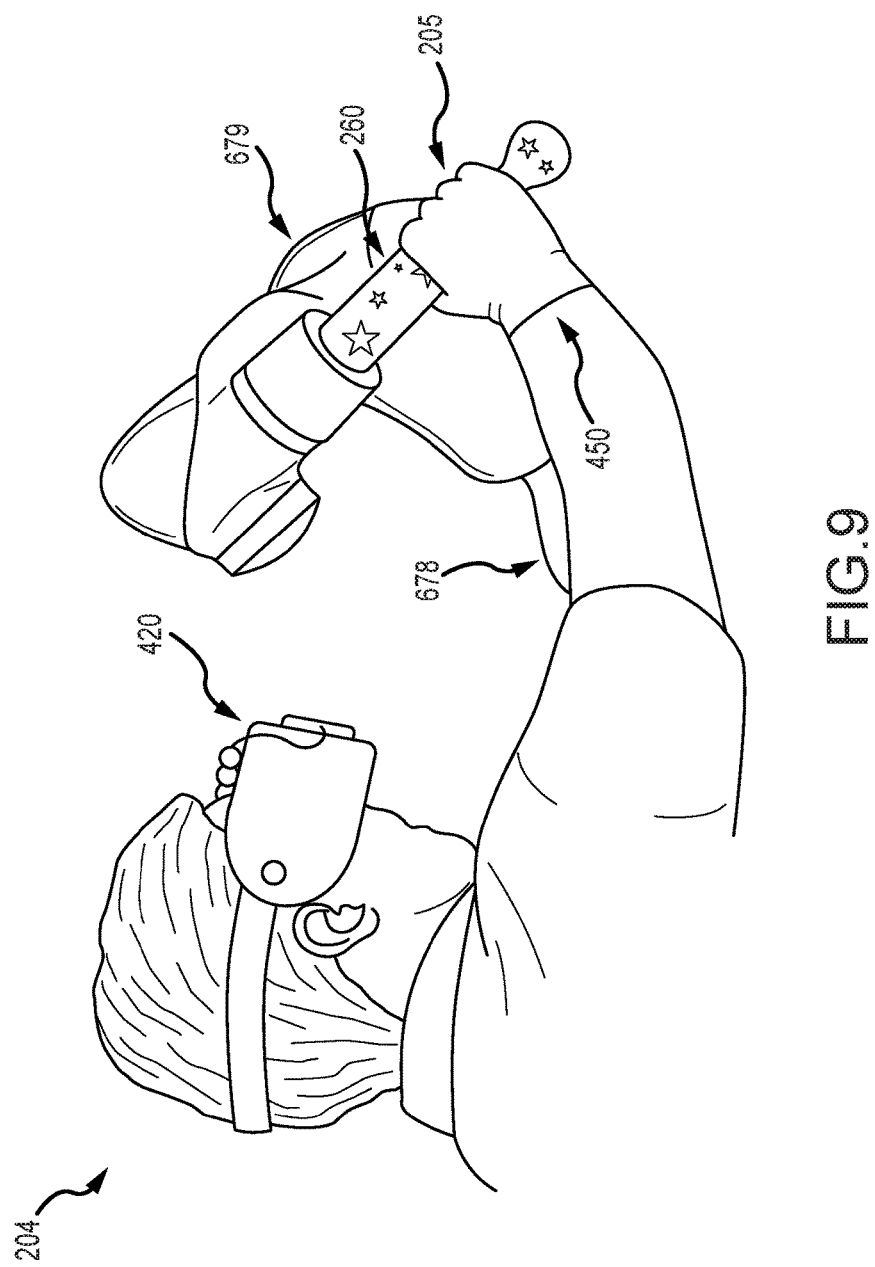
FIG. 9 illustrates a step or operations of the system when the physical interaction occurs and the interaction event concurrently occurs in the VR world provided by the VR system.

FIG. 9 illustrates operation of the system during the physical interaction. Particularly, the robotic mechanism 678 is operating via movement of its manipulator (arm and gripper in this case) 679 to position the physical object 260 into the VR user's hand 205 (which is covered by tracking element glove 450). In the VR world provided by the VR system, the VR world is configured to include a defined interaction event that is timed to occur at the time when the object 260 contacts the hand 205 (i.e., the tracked body part or contact surface on the user's body). In other words, the VR world displayed to the user on the display screen now shows the virtual object in the displayed image of the user's hand (e.g., after being shown flying or otherwise traveling from a first location in the VR world to a second location in the VR world corresponding with the user's hand location). In this way, the timing of the physical interaction and the interaction event in VR world are time synchronized.

In this example, the physical interaction is defined as the robot 678 placing the object 260 in the user's hand 205 (or against the palm) at a particular velocity (and/or with a particular contact force) and then for the manipulator to release the object 260 and move away from the user 204. At this point, the user 204 is solely holding and supporting the physical object 260. In other examples, though, the robotic mechanism 678 may continue to hold/support the object such as to provide the feel of a struggle for the object 260, to provide resistance to release the object (e.g., pull an object away from a VR world surface or character), or to even pull the object 260 back away from the user's hand 205 (or other contact surface on the user 204).

Figure 10:
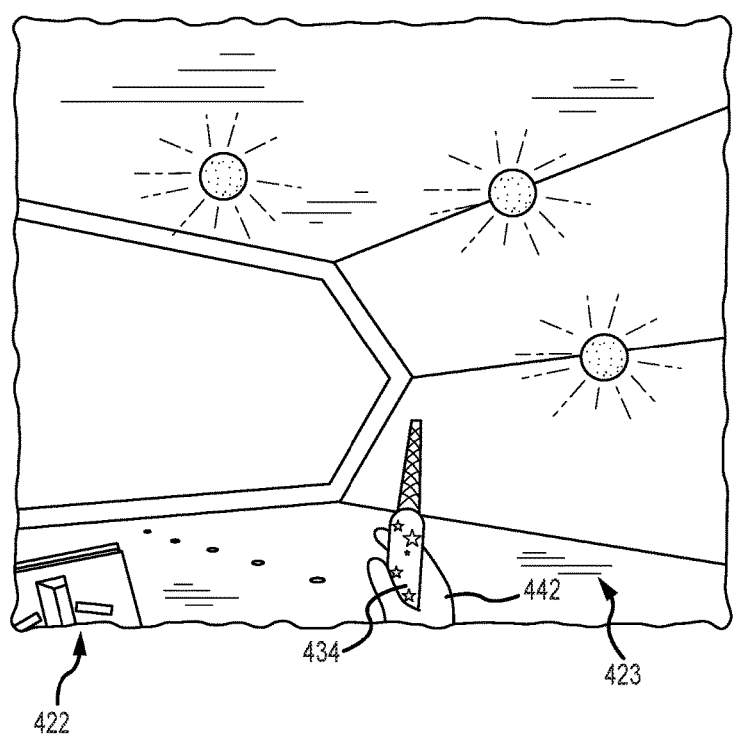
FIG. 10 illustrates the display screen of the VR headset of the system during operations of the VR system to update views of the VR world after a physical object has been placed into the VR user's hand.

FIG. 10 illustrates the display screen/monitor 422 of the user's headset 420 as it is being operated by the VR system after the physical interaction and interaction event shown in FIG. 9. As shown, the VR system acts to now show that the user's hand is holding the physical object with an image 442 in the virtual world 423 of the users' hand (or tracked body part) generated to show it grasping or holding the weapon with an image 434 of the virtual object corresponding to the physical object 260 shown in the virtual hand/image 442. The virtual version 434 of the physical object 260 can now be used/activated in the VR world 423 such as by further tracking of the user's hand via tracking element glove 450 and tracking components of the VR system.

In some cases, tracking elements/buttons may also be provided on the physical object 260 to allow the VR system to track its location/orientation or to determine if/when the user 204 stops holding it in their hand 205 (or if they unsuccessfully catch or grasp the object 260 in the interaction step shown in FIG. 9). The tracking information may also or instead be used by the physical interaction system to control movements of the manipulator 679 to facilitate proper orienting of the object 260 prior to the handoff/interaction provided in FIG. 9.

Figure 11:
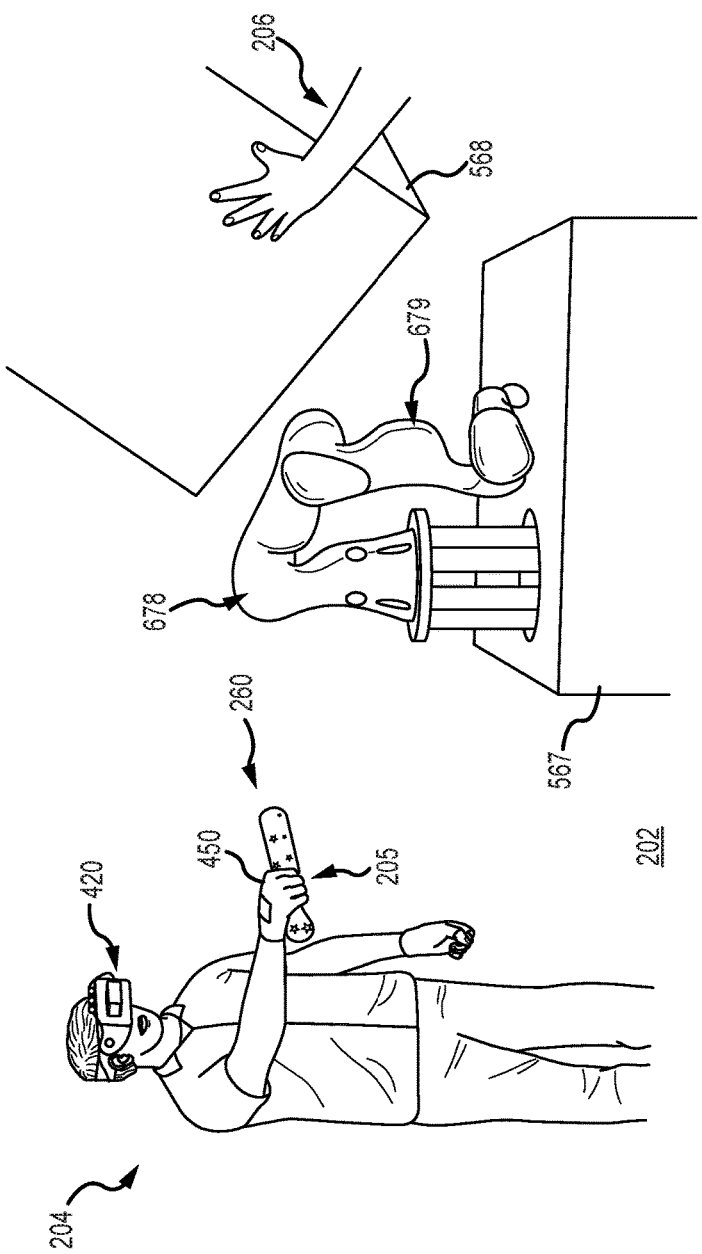
FIG. 11 shows the VR space in a later step or operations of the system to hide the presence of the physical interaction system and while the VR user continues to manipulate the physical object to affect the VR world experience provided by the VR system.

FIG. 11 illustrates the VR space 202 after the step/operation of the system shown in FIGS. 9 and 10. Particularly, the VR user 204 is shown to be still grasping the physical object 260 in their hand 205 covered by tracking element glove 450. The VR system operates to modify the VR world it creates and displays to the user in the screen of the headset 420 to reflect the presence of the object 260 (or of a virtual object in the VR world that corresponds to the physical object 260). To further the VR experience and physical world interaction for the user 204, the operator/guide 206 acts, while the user 204 is still wearing the headset 420 such that their ability to view the space 202 is prevented, to return the cover/shield 568 to its original location to hide the presence of the robotic mechanism 568 from the user 204. After the VR experience is completed, the VR user 204 can remove the headset 420, and the VR space 202 will appear consistent with their expectations with the physical object 260 in their hand and the visual shield/cover 568 back in place.

Figure 12:
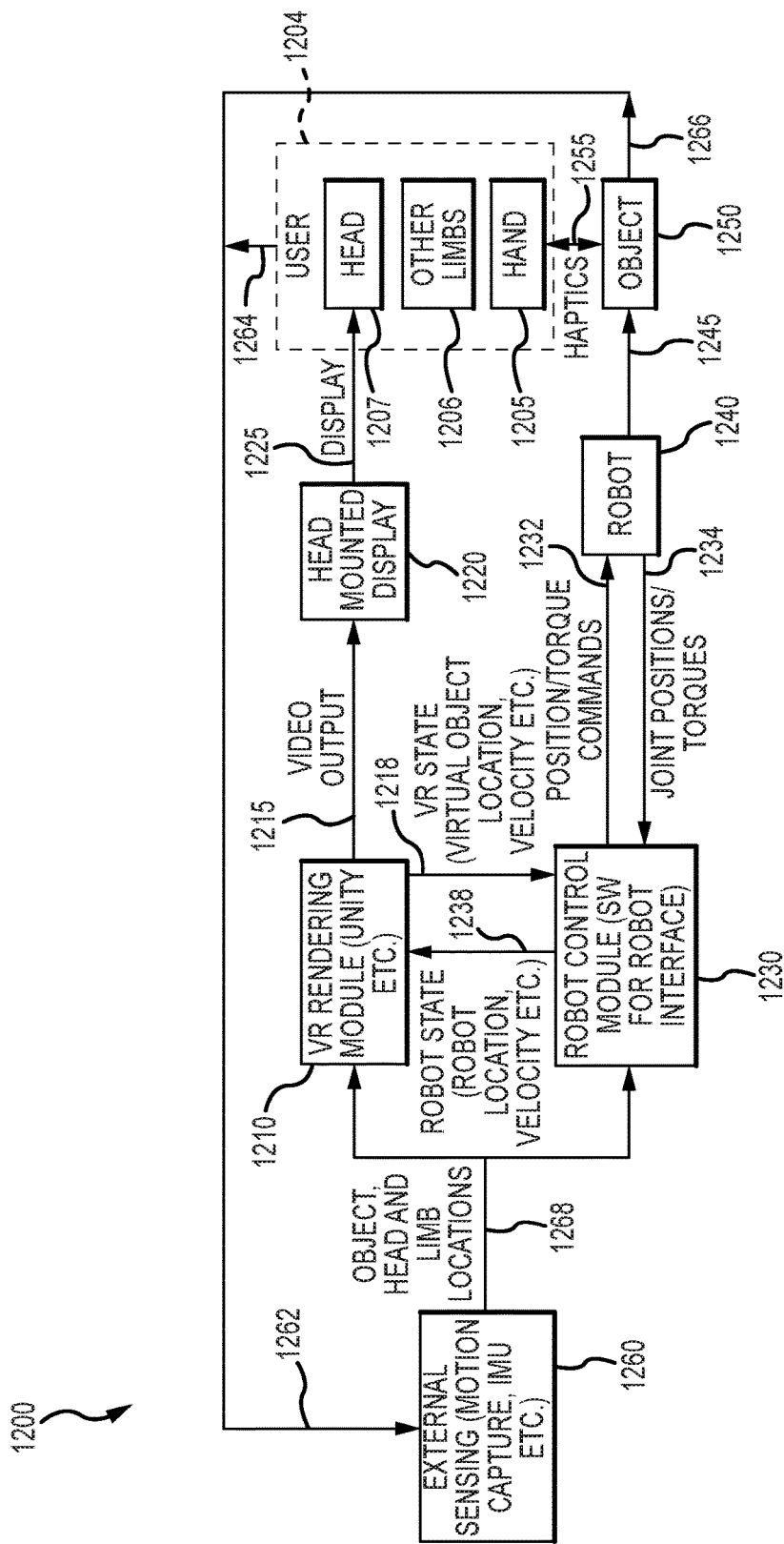
FIG. 12 illustrates a functional block diagram of another implementation of a system of the present description useful for providing physical interactions to a user of VR system that are synchronized with interaction events in the VR world provided by the VR system.

FIG. 12 illustrates a functional block diagram of another implementation of a system 1200 of the present description useful for providing physical interactions to a user of a VR system that are synchronized with interaction events in the VR world provided by the VR system. The system 1200 may include components similar to or different from those of the system 100 and may be operated to provide the VR experience with physical interactions as shown in FIGS. 2-11.

As shown, the system 1200 is operated to provide a unique VR experience with physical interactions for a VR user 1205. The user 1205 has the location, movement, and/or orientation of their hand(s) 1205, other limbs/body parts/contact surfaces 1206, and/or head 1207 tracked by collection of tracking data 1262 such as including information 1264 from tracking elements on the hand 1205, limbs 1206, and head 1205 by an tracking system 1260. The tracking system 1260 may be configured for external sensing such as with motion capture, with an IMU (inertial measurement unit), or the like. This tracked information is processed and provided to the VR rendering module 1210 and robot control module 1230 as shown at 1268 for their use, respectively, in generating a VR world and in controlling a robot 1240 to provide desired physical interactions with the user 1205.

The VR system portion of the system 1200 includes a VR rendering module 1210 (such as a VR application available from Unity or the like), which generates a video output 1215 (images of a VR world) in part based on tracking data 1268 of the user 1204 as well as of the physical object 1250. The video output 1215 is provided to a head mounted display (HMD) 1220 that is worn by the user 1204 on their head 1207, and the HMD 1220 includes a screen for providing a display 1225 generated from the video output 1215 from the VR rendering module 1210. As discussed above, the VR rendering module 1210 is configured to display virtual images of the user 1204 such as of their hand 1205 or other limbs 1206 that are to be contact surfaces for a physical interaction with a physical object 1250. The module 1210 also displays an image of a virtual object in the video output 1215 that corresponds to the physical object 1250 and that is caused to be located, oriented, and moved in the VR world provided in the video output to suit a particular VR world storyline and to support one or more interaction events.

The physical interaction system components of the system 1200 include a robot control module 1230, which may include software for a robot interface. The module 1230 is configured to receive as input VR state information 1218 from the VR rendering module 1210 that may define a location of a virtual object (corresponding to the physical object 1250) in the VR world being provided in display 1225 to the user 12014. The VR state information 1218 may also include the present velocity of the virtual object (again, corresponding to the physical object 1250) in the VR world associated with the video output 1215 and provided in display 1225 to the user 1204. Additional information in the VR state information may include the orientation of the VR object and, significantly, a definition of an upcoming interaction event in the VR world (e.g., when it may be triggered and the like) for use in synchronization of movement of the object 1250 to a position relative to the user 1204 to provide a haptic 1255 or physical interaction with the object 1250.

The robot control module 1230 further receives as input tracking data 1268 from the external sensing-based tracking system 1260. The tracking data 1268 may include the present location, velocity, and/or orientation of the object 1250 (and/or contact surfaces on the object 1250) and may also include the tracking data from the user 1204 (such as a location of one or more contact surfaces on the hand 1205, the limbs 1206, and the head 1207 or the like). The robot control module 1230 may facilitate synchronization of the VR world (or video output 1215) with operation of a robot 1240 to place/move the object 1250 by providing robot state data 1238 to the VR rendering module 1210 (e.g., to allow the module 1210 to know the robot manipulator's location, velocity, and so on as this may effect timing of triggering of an interaction event in the VR world by the module 1210).

The robot control module 1230 functions to generate position/torque and/or other control commands 1232 that are transmitted to or used to operate a robot 1240. The robot 1240, as discussed above, may take a wide variety of forms to practice the invention and may include a manipulator (e.g., a movable arm and gripper that both can be selectively operated by control module 1230). The robot 1240 is shown with arrow 1245 to function to position and move (or manipulate) the physical object 1250 in the space surrounding the user 1204. The control module 1230 takes as input/feedback the joint positions/torques 1234 of the robot 1240, which facilitates proper control including generation of future commands 1232. As discussed above with regard to FIG. 1 and with the operational example of FIGS. 2-11, the robot 1240 is operated by the module 1230 to synchronize the movement 1245 to time the delivery of the object 1250 as well as the velocity, orientation, and/or other parameters for haptics 1255 with an interaction event produced by the VR rendering module 1210 in video output 1215.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

The inventors recognized some VR systems had been developed that were considered physical VR systems because they placed real objects in locations that matched the location of virtual counterparts. In this way, VR users were able to experience appropriate touch sensations, and this made the immersion into the VR world self-consistent and more powerful. However, the inventors understood that such physical VR systems were only useful for a VR experience that included wholly stationary objects, and these systems were not actively controlled to match the user's movements.

The inventors with the systems described herein have introduced a VR world with interaction events in which users of the VR system are able to have physical interactions with moving or dynamic physical objects or objects that the user may physically use and move in the real world or surrounding physical space and have these uses/movements translated into uses/movements of the virtual object that corresponds with the physical object within the virtual world. The physical objects can move slow-to-quickly, be made to fly through the space about the user, may roll, or move in other ways that match those of their virtual counterparts. Users of the VR system, hence, can both see and touch, catch, grab, toss, hit, or otherwise have physical interactions with virtual objects in the VR world and concurrently with corresponding physical objects in the real world about the user. The virtual worlds, thus, become far more dynamic, alive, and interesting to the VR system user. The storyline provided by the VR system may allow the user to have a superhero-type experience in which they are able to use their superpowers to have a physical interaction that seems beyond human abilities (such as to use their mind to cause the physical object to fly across a space and land in their hand with the virtual object shown flying through space while a robot moves the real world object from an original position to the viewer's hand).

The inclusion of dynamic objects and extensions beyond statically-placed objects can help create VR worlds that are far richer, more life-like, and, in some cases, superhero-like as virtual reality is mixed with the real world. The VR experiences are enhanced and can explore more active interactions between the user and physical objects and/or virtual objects in the VR world. The dynamic nature of the physical objects and interactions with the user also tightens the demand to precisely synchronize all senses in the VR world including vision, audio, and touch. The use of a programmable robotic mechanism provides both the required precision and creates flexibility to achieve various effects. The proposed system(s) taught herein use a robotic mechanism external to the user that is not attached to or worn by the user. This enables a more natural VR interaction event coordinated with a physical interaction outside the VR world as opposed to the experiences provided by previous approaches, which required the user to wear devices for haptic cues.

The trigger for initiating an interaction event and to cause the robot to move the object from its holding distance or location relative to the user's hand (or other tracked body part) may vary to practice the invention. In one embodiment, the user may position their hand (or other tracked body part) in a certain location in the space or with a particular orientation (and/or location relative to their body) and hold this pose for a predefined time period. The tracking system tracks this movement by the user, and the VR system rendering module and robot controller may both identify the trigger (or one may identify the trigger and communicate this to the other controller). Typically, the distance at which the robot holds the physical object apart from the user's contact surface/tracked body part will be smaller (or at least differ) than the distance in the virtual world between the virtual object and the representation of the user's tracked body part in the virtual world. Hence, the robot controller may initiate movement of the physical object after a time when the virtual object is shown in the image of the virtual world, with the later time chosen to allow the robot to move the physical object at the same velocity as the virtual object in the virtual world for simultaneous (or time synchronization) occurrences in the virtual world and the real world of the object (physical and virtual) contacting the user's hand (real world hand and virtual representation they are viewing in their headset).

In other cases, the virtual world may be generated to mimic movement of the physical object by tracking the relative distance between the physical object and the user's tracked body part and using the same velocity as the robot to move the virtual object in the virtual world so as to achieve time synchronization of the two contacting events. In some cases, the location of the user's hand/body part is not fixed during the interaction event and the virtual world is rendered to adjust movement of the virtual object to the new hand/body part location as is the robot in the real world space about the VR user.

It will be recognized by those skilled in the arts that many additional and different experiences that blend the physical world and the VR world through operations of the systems described herein. For example, the exemplary operations of the system 100 provided in FIGS. 2-11 may be expanded to include one or more extra features. After the operator physically shows the user the physical object 260 (to establish its reality in the physical world), and before the user puts on the head-mounted VR display, the operator places the object 260 into an object (e.g., a tool or weapon) holder, which can be a motor-driven "shaker." The user is then asked to stretch out their hand to see whether they can cause the object 260 to leap into their hand from a distance away (e.g., from 10 to 20 feet away). The user stands in the same place as they will in the future VR case, and the same VR tracking system that is employed when the user is immersed in the VR experience is now used to track their outstretched hand. The user is asked to move their hand back and forth slowly to see whether they can attract the physical object 260.

When the user moves their hand through the area where the robot is operated/controlled later to hand them the object 260 in the VR world, the object holder rocks the physical object 260 back and forth. The rocking strength is varied by the control system from barely moving to rocking back and forth violently as if trying to fly depending on how close the user's hand is to the future ideal interaction position in the later VR experience. These "pre-show" operations have two important effects: (a) it "trains" the user roughly where their hand should be when they will catch in VR; and (b) it also makes the user feel that a "magical" experience was actually occurring (this being in theme with the overall story line). After the user has tried unsuccessfully to pull the physical object 260 to them without the HMD on, they are advised that their powers will be increased by dawning the HMD helmet, which may be disguised as a helmet from a particular movie or animation to fit the VR experience and/or otherwise themed to enhance the overall experience.

The systems described herein such as system 100 may be configured to be able to sense user/player actions both when they are in the VR world and before they enter it. For example, in a telekenesis simulation use for the system 100, the object to ultimately be interacted with in the full VR experience may sit on a motorized platform (or yet another "robot") so that the user/player is surreptitiously taught how to hold their hand (or other body part(s)) in an area/space that will support the proper use of the ensuing VR experience. The mechanized physical experience adds credence to the subsequent VR interaction.

With regard to there being a physical object and handover, besides passing to and grabbing an object from the user, the systems can be configured for "sword fighting" or "slapping" where there is a dynamic physical interaction (and hence, some physical thing), but the object may not be detachable from the mechanism. For example, a VR character's hand touches the user and the physical robot also touches the user's hand using some form of paddle. With regard to matching, the physical and virtual objects do not have to match with regard to: (a) their motion, e.g., could take a different path; (b) their speed (especially if they take a different path); and (c) their shape, color, texture, details, and the like.

In many implementations, the "dynamic physical interaction" is the core aspect. In particular, claims calling out "virtual corresponding to physical" and "move physical based on virtual" should be construed as being non-restrictive or broadly construed, with the physical environment/mechanisms being programmed based on other things, too, in some cases. In many situations, the velocities of the virtual and physical objects do not have to match (and generally do not). The release of the physical object could also happen slightly before or at the same time as impact. Shortly after allows for forces to build up and gives the object and extra "umph," which makes sense if the physical velocity is smaller than the virtual.

Again, with regard to matching, the virtual and physical objects may be in different places. For example, if the VR participant drops a physical object, the virtual object could fall, bounce, or break while the physical is retrieved. The travel paths can be different for the virtual and physical objects. For example, the virtual flies in an arc while the physical is delivered in straight line. The velocities may also be different. With regard to impact, the robot may deliver or apply a certain force before releasing such as to simulate different impact speeds or convey more/less inertia. The robot's release of the physical object may be before (so object literally flies into contact) to after (to build up force and assure proper "catching") while, in other implementations, there may be no release (slapping, sword fighting, or the like) or a grab. With regard to coordination, the coordination can be determined/driven by virtual (to match the "story") or physical (to accommodate last second user movements). Both virtual and physical systems/assemblies can drive the coordination, e.g., orientation by virtual, timing by physical, and the like. Orientation could match the user's contact surface (palm of hand) or whatever is appropriate to the VR story. The events could be triggered by voice command as well as actions, movements, buttons, and the like.

With regard to the system setup, the "robot" could be cables and/or could be retractable. The robot could be hidden in the floor, ceiling, walls, and the like. The tracking could be marker-less, and, in some cases, the room could be dark (to further hide things) and tracking with infrared. With regard to the physical object(s), the objects used could also be balls, frisbee, sticks, and so on. The physical object can include buttons/switches that trigger physical effects (vibrations and so on) as well as virtual effects (lights, behavior, extending energy beam, and the like). Again, synchronization and/or matching makes this exciting for the user. Objects could have a "mind of their own" and act independently of the user. The robot could be the physical object.

We claim:

1. A system for providing a dynamic physical interaction to a user during a virtual reality (VR) experience, comprising:
   a VR system including a headset with a display screen and a VR rendering module generating a video output, wherein the display screen displays an image of a virtual world based on the video output; and
   a physical interaction system comprising a robotic mechanism with an object manipulator and a robot control module generating commands for operating the robotic mechanism to selectively position a physical object within a space,
   wherein a wearer of the headset is positioned in the space,
   wherein the image of the virtual world includes an image of a virtual object corresponding to the physical object,
   wherein the commands generated by the robot control module cause the robotic mechanism to move the physical object in the space based on a state of the virtual object in the virtual world,
   wherein the commands generated by the robot control module cause the object manipulator to move the physical object into contact with a surface on a body part of the wearer at a first time,
   wherein the image of the virtual world includes an image of a virtual body part corresponding to the body part of the wearer,
   wherein the image of the virtual object is shown in the image of the virtual world to move into contact with the image of the virtual body part at a second time matching the first time,
   wherein the state of the virtual object in the virtual world includes a velocity, and wherein the commands cause the object manipulator to move the physical object through the space at a velocity matching the velocity of the virtual object in the virtual world.

2. The system of claim 1, further comprising a tracking system generating tracking data for the body part of the wearer, wherein the image of the virtual body part is provided at a location in the image of the virtual world corresponding to a body part location identified by the tracking data and wherein the object manipulator moves the physical object to a location in which the physical object at least partially coincides with the body part location to cause the physical object to contact the body part of the wearer at the first time.

3. The system of claim 2, wherein the tracking data includes an orientation of the body part of the wearer and wherein the commands cause the object manipulator to adjust an orientation of the physical object based on the orientation of the body part of the wearer prior to the first time.

4. The system of claim 1, wherein the commands generated by the robot control module cause the object manipulator to release the physical object at a third time after the first time.

5. The system of claim 1, wherein the body part includes a hand of the wearer of the headset, wherein the surface comprises the palm of the hand, and wherein the commands cause the object manipulator to halt travel at a preset distance past a location of the palm of the hand at about the first time.

6. A system for enhancing a VR experience, comprising:
a VR rendering module generating a video of a virtual world;
a headset, wearable by a participate in the VR experience, with a screen displaying the video of the virtual world;
a tracking system for tracking velocity and location of at least one portion of a body of the participant in a space;
a physical object in the space, wherein the VR rendering module operates to include an image of a virtual object in the virtual world based corresponding to the physical object and an image of a virtual body part corresponding to the at least one portion of the body of the participant based on the velocity and the location from the tracking system; and
a robotic mechanism moving the physical object in the space to the location of the at least one portion of the body of the participant,
wherein the VR rendering module concurrently generates the video of the virtual world with the virtual object contacting the virtual body part, and
wherein the robotic mechanism manipulates an orientation of the physical object prior to positioning the physical object at the location of the at least one portion of the body of the participant, whereby the orientation matches an orientation of the virtual object in the virtual world during the contacting with the virtual body part.

7. The system of claim 6, wherein the VR rendering module generates the video of the virtual world to include an interaction event between the virtual object and the virtual body part including moving the virtual object from a first location to a second location in the virtual world where the virtual object contacts the virtual body part at a velocity and wherein the robotic mechanism is controlled to move the physical object at a velocity corresponding to the velocity of the virtual object in the virtual world as the physical object is moved to the location of the at least one portion of the body of the participant.

8. The system of claim 6, wherein an arrival of the physical object at the location of the at least one portion of the body of the participant is synchronized in time with the video of the virtual world showing the virtual object contacting the virtual body part.

9. The system of claim 6, wherein the robotic mechanism includes a gripper for selectively gripping and releasing the physical object and wherein the gripper releases the physical object within a predefined time period after the physical object is moved into the location of the at least one body part of the participant.

10. The system of claim 9, wherein the robotic mechanism releases the physical object after sensing a force greater than a predefined impact force has been imparted upon the at least one body part of the participant.

11. A system for providing a VR experience with haptics, comprising:
a VR system displaying an image of a virtual world to a VR user including a virtual object at a first location;
a tracking system tracking a location of a contact surface on a body of the VR user, wherein the VR system includes an image of a virtual contact surface at a second location in the virtual world corresponding to the location of the contact surface on the body tracked by the tracking system; and
a physical interaction system including a robot controller and a robotic mechanism,
wherein the robot controller generates commands to operate the robotic mechanism to move a physical object from a location spaced apart a distance from the location of the contact surface to a new location whereby the physical object abuts the contact surface on the body of the VR user,
wherein the VR system concurrently modifies the image of the virtual world to show the virtual object travel from the first location to the second location in the virtual world, whereby arrival of the physical object at the new location and arrival of the virtual object at the second location are time synchronized,
wherein the VR system shows the virtual object traveling at a first velocity from the first location to the second location, and
wherein the robot controller generates the commands to cause the robotic mechanism to move the physical object at a second velocity matching the first velocity when the physical object is caused to abut the contact surface of the body of the VR user.

12. The system of claim 11, wherein the robot controller generates the commands to operate the robotic mechanism to define an orientation of the physical object that matches an orientation of the virtual object in the virtual world.

13. The system of claim 11, wherein the tracking system tracks an orientation of the contact surface on the body of the VR user and wherein the robot controller generates the commands to operate the robotic mechanism to define an orientation of the physical object that matches the orientation of the contact surface determined by the tracking system.

14. The system of claim 13, wherein the contact surface on the body comprises a palm of a hand of the VR user and wherein the tracking system includes a glove with tracking elements worn on the hand of the VR user.

15. The system of claim 14, wherein the physical object comprises a handle or hilt.

16. The system of claim 11, wherein the VR system includes a headset wearable by the VR user, wherein the headset includes a screen displaying the image of the virtual world, and further including a physical visual shield selectively positioned relative to the VR user in the space to block a line of sight from the VR user to the robotic mechanism.

17. A system for providing a dynamic physical interaction to a user during a virtual reality (VR) experience, comprising:
 a VR system including a headset with a display screen and a VR rendering module generating a video output, wherein the display screen displays an image of a virtual world based on the video output; and
 a physical interaction system comprising a robotic mechanism with an object manipulator and a robot control module generating commands for operating the robotic mechanism to selectively position a physical object within a space,
 wherein a wearer of the headset is positioned in the space,
 wherein the image of the virtual world includes an image of a virtual object corresponding to the physical object,
 wherein the commands generated by the robot control module cause the robotic mechanism to move the physical object in the space based on a state of the virtual object in the virtual world,
 wherein the commands generated by the robot control module cause the object manipulator to move the physical object into contact with a surface on a body part of the wearer at a first time,
 wherein the image of the virtual world includes an image of a virtual body part corresponding to the body part of the wearer,
 wherein the image of the virtual object is shown in the image of the virtual world to move into contact with the image of the virtual body part at a second time matching the first time,
 wherein the body part includes a hand of the wearer of the headset, and
 wherein the commands cause the object manipulator to halt travel at a preset distance past location a tracked location of the hand at about the first time.

18. A system for enhancing a VR experience, comprising:
 a VR rendering module generating a video of a virtual world;
 a headset, wearable by a participate in the VR experience, with a screen displaying the video of the virtual world;
 a tracking system for tracking velocity and location of at least one portion of a body of the participant in a space;
 a physical object in the space, wherein the VR rendering module operates to include an image of a virtual object in the virtual world based corresponding to the physical object and an image of a virtual body part corresponding to the at least one portion of the body of the participant based on the velocity and the location from the tracking system; and
 a robotic mechanism moving the physical object in the space to the location of the at least one portion of the body of the participant,
 wherein the VR rendering module concurrently generates the video of the virtual world with the virtual object contacting the virtual body part,
 wherein the robotic mechanism includes a gripper for selectively gripping and releasing the physical object,
 wherein the gripper releases the physical object within a predefined time period after the physical object is moved into the location of the at least one body part of the participant, and
 wherein the robotic mechanism releases the physical object after sensing a force greater than a predefined impact force has been imparted upon the at least one body part of the participant.

19. The system of claim 18, wherein the VR rendering module generates the video of the virtual world to include an interaction event between the virtual object and the virtual body part including moving the virtual object from a first location to a second location in the virtual world where the virtual object contacts the virtual body part at a velocity and wherein the robotic mechanism is controlled to move the physical object at a velocity corresponding to the velocity of the virtual object in the virtual world as the physical object is moved to the location of the at least one portion of the body of the participant.

20. The system of claim 18, wherein an arrival of the physical object at the location of the at least one portion of the body of the participant is synchronized in time with the video of the virtual world showing the virtual object contacting the virtual body part.

\* \* \* \* \*